US005703283A

United States Patent [19]

McClish et al.

[11] Patent Number: 5,703,283
[45] Date of Patent: Dec. 30, 1997

[54] DETRENDING ENGINE POSITIONAL DATA FOR ROTATING POSITION ENCODERS

[75] Inventors: Michael A. McClish, Northville; Marvin L. Lynch, Detroit; Margaret A. Selfe, Farmington Hills; Gregory A. Steinl, Royal Oak; Donald J. Remboski, Jr., Dearborn, all of Mich.

[73] Assignee: Motorola Inc., Schaumburg, Ill.

[21] Appl. No.: 562,532

[22] Filed: Nov. 24, 1995

[51] Int. Cl.$^6$ ................................................. G01M 15/00
[52] U.S. Cl. .................................. 73/116; 364/431.07
[58] Field of Search ........................... 73/116, 117.2, 73/117.3, 118.1; 364/431.04, 431.03, 431.07

[56] References Cited

U.S. PATENT DOCUMENTS

| | | | |
|---|---|---|---|
| 5,117,681 | 6/1992 | Dosdall et al. | 73/116 |
| 5,434,800 | 7/1995 | Davis et al. | 364/431.04 |
| 5,528,931 | 6/1996 | James et al. | 73/117.3 |
| 5,531,108 | 7/1996 | Feldkamp et al. | 73/117.3 |
| 5,559,705 | 9/1996 | McClish et al. | 73/117.3 |

*Primary Examiner*—George M. Dombroske
*Attorney, Agent, or Firm*—Nicholas C. Hopman

[57] ABSTRACT

A method for detrending engine positional data includes acquiring positional encoder data over a plurality of consecutive engine revolutions as the engine is decelerating. Then, a trend (207) in the acquired positional encoder data consistent with behavior occurring at less than a frequency of one cycle per engine revolution is identified. Next, corrected positional encoder data (208) is generated dependent on removing the identified trend (207).

21 Claims, 6 Drawing Sheets

| Cycle 501 | Mark 503 | Event 505 | Delta Time 507 | Revolution Mean 509 | Cycle Mean 511 | Slope Between Cycle Means 513 | Slope/Delta Time 515 | Y Intercept of Line Segment Between Means of Cycles 517 | Trend Line Y Values 519 | Mean Value of All Samples Within a Revolution 521 | Difference Between Mean Value of the Trend Line and Each Y Value on the Trend Line 523 | Corrected Delta Times 525 |
|---|---|---|---|---|---|---|---|---|---|---|---|---|
| n | m | 1 | 1.000E-03 | | | | | | | | | |
| n | m+1 | 2 | 1.010E-03 | | | | | | | | | |
| n | m+2 | 3 | 1.020E-03 | | | | | | | | | |
| n | m+3 | 4 | 1.030E-03 | 0.00102 | | | | | | | | |
| n | m | 5 | 1.070E-03 | | | | | | | | | |
| n | m+1 | 6 | 1.050E-03 | | | | | | | | | |
| n | m+2 | 7 | 1.060E-03 | | | | | | | | | |
| n | m+3 | 8 | 1.070E-03 | 0.00106 | 0.00104 | | | | | | | |
| n+1 | m | 9 | 1.110E-03 | | | | | | | | | |
| n+1 | m+1 | 10 | 1.090E-03 | | | | | | | | | |
| n+1 | m+2 | 11 | 1.100E-03 | | | | | | | | | |
| n+1 | m+3 | 12 | 1.110E-03 | 0.00110 | | | | | | | | |
| n+1 | m | 13 | 1.150E-03 | | | | | | | | | |
| n+1 | m+1 | 14 | 1.130E-03 | | | | | | | | | |
| n+1 | m+2 | 15 | 1.140E-03 | | | | | | | | | |
| n+1 | m+3 | 16 | 1.150E-03 | 0.00114 | 0.00112 | 8.375E-05 | 1.047E-05 | 0.00104 | 0.00116 | | -3.664E-05 | 0.00123 |
| n+2 | m | 17 | 1.190E-03 | | | | 1.047E-05 | | 0.00117 | | -2.617E-05 | 0.00120 |
| n+2 | m+1 | 18 | 1.170E-03 | | | | 1.047E-05 | | 0.00119 | | -1.570E-05 | 0.00120 |
| n+2 | m+2 | 19 | 1.180E-03 | | | | 1.047E-05 | | 0.00120 | | -5.234E-06 | 0.00120 |
| n+2 | m+3 | 20 | 1.190E-03 | 0.00118 | | | | | | | | |

FIG. 5B

| CYCLE | MARK | EVENT | DELTA TIME | REVOLUTION MEAN | CYCLE MEAN | SLOPE BETWEEN CYCLE MEANS | SLOPE/ DELTA TIME | Y INTERCEPT OF LINE SEGMENT BETWEEN MEANS OF CYCLES | TREND LINE Y VALUES | MEAN VALUE OF ALL SAMPLES WITHIN A REVOLUTION | DIFFERENCE BETWEEN MEAN VALUE OF THE TREND LINE AND EACH Y VALUE ON THE TREND LINE | CORRECTED DELTA TIMES |
|---|---|---|---|---|---|---|---|---|---|---|---|---|
| n+2 | m | 21 | 1.230E-03 | | | | 1.047E-05 | | 0.00121 | | 5.234E-06 | 0.00122 |
| n+2 | m+1 | 22 | 1.210E-03 | | | | 1.047E-05 | | 0.00122 | | 1.570E-05 | 0.00119 |
| n+2 | m+2 | 23 | 1.220E-03 | | | | 1.047E-05 | | 0.00123 | | 2.617E-05 | 0.00119 |
| n+2 | m+3 | 24 | 1.230E-03 | 0.00122 | 0.00120 | 8.000E-05 | 1.000E-05 | 0.00104 | 0.00124 | 0.00120 | 3.664E-05 | 0.00119 |
| n+3 | m | 25 | 1.270E-03 | | | | 1.000E-05 | | 0.00124 | | -3.500E-05 | 0.00131 |
| n+3 | m+1 | 26 | 1.250E-03 | | | | 1.000E-05 | | 0.00125 | | -2.500E-05 | 0.00128 |
| n+3 | m+2 | 27 | 1.260E-03 | | | | 1.000E-05 | | 0.00126 | | -1.500E-05 | 0.00128 |
| n+3 | m+3 | 28 | 1.270E-03 | 0.00126 | | | 1.000E-05 | | 0.00127 | | -5.000E-06 | 0.00128 |
| n+3 | m | 29 | 1.310E-03 | | | | 1.000E-05 | | 0.00128 | | -5.000E-06 | 0.00131 |
| n+3 | m+1 | 30 | 1.290E-03 | | | | 1.000E-05 | | 0.00129 | | 5.000E-06 | 0.00128 |
| n+3 | m+2 | 31 | 1.300E-03 | | | | 1.000E-05 | | 0.00130 | | 1.500E-05 | 0.00128 |
| n+3 | m+3 | 32 | 1.310E-03 | 0.00130 | 0.00128 | 8.000E-05 | 1.000E-05 | 0.00104 | 0.00131 | 0.00128 | 2.500E-05 | 0.00128 |
| n+4 | m | 33 | 1.350E-03 | | | | 1.000E-05 | | 0.00132 | | 3.500E-05 | 0.00131 |
| n+4 | m+1 | 34 | 1.330E-03 | | | | 1.000E-05 | | 0.00133 | | -3.500E-05 | 0.00136 |
| n+4 | m+2 | 35 | 1.340E-03 | | | | 1.000E-05 | | 0.00134 | | -2.500E-05 | 0.00136 |
| n+4 | m+3 | 36 | 1.350E-03 | 0.00134 | | | 1.000E-05 | | 0.00135 | | -1.500E-05 | 0.00136 |
| n+4 | m | 37 | 1.390E-03 | | | | 1.000E-05 | | 0.00136 | | -5.000E-06 | 0.00139 |
| n+4 | m+1 | 38 | 1.370E-03 | | | | 1.000E-05 | | 0.00137 | | 5.000E-06 | 0.00136 |
| n+4 | m+2 | 39 | 1.380E-03 | | | | 1.000E-05 | | 0.00138 | | 1.500E-05 | 0.00136 |
| n+4 | m+3 | 40 | 1.390E-03 | 0.00138 | 0.00136 | 8.000E-05 | 1.000E-05 | 0.00104 | 0.00139 | 0.00136 | 2.500E-05 | 0.00136 |
| | | | | | | | | | | | 3.500E-05 | 0.00135 |

DETRENDING ENGINE POSITIONAL DATA FOR ROTATING POSITION ENCODERS

FIELD OF THE INVENTION

This invention is generally directed to the field of reciprocating engine controls, and specifically for compensating for profile errors associated with an encoder indicating engine rotary position.

BACKGROUND OF THE INVENTION

Contemporary engine misfire detection systems for reciprocating engines use position encoders affixed to an engine's crankshaft to determine rotary position of an engine. From this rotary position measurement, an engine speed and/or absolute position information can be derived. With this information the engine can be controlled in accordance with its mission, and combustion misfires can be detected. Such position encoders, and their associated systems, are subject to manufacturing and installation inaccuracies. Furthermore, commonly used sensors behave with other dynamic inconsistencies associated with various electronic and magnetic effects as the engine rotates. These inaccuracies and inconsistencies lead to erroneous indications of true (physical) engine rotary position as the position encoder rotates. Erroneous position indication leads to inaccuracies in post-processing steps such as derivation of engine rotary velocity and/or acceleration. This is crucial because engine velocity and/or acceleration are often used to operate an engine and to determine combustion misfire behavior. An example of a typical contemporary engine position encoder system will be detailed next.

Figure 1:
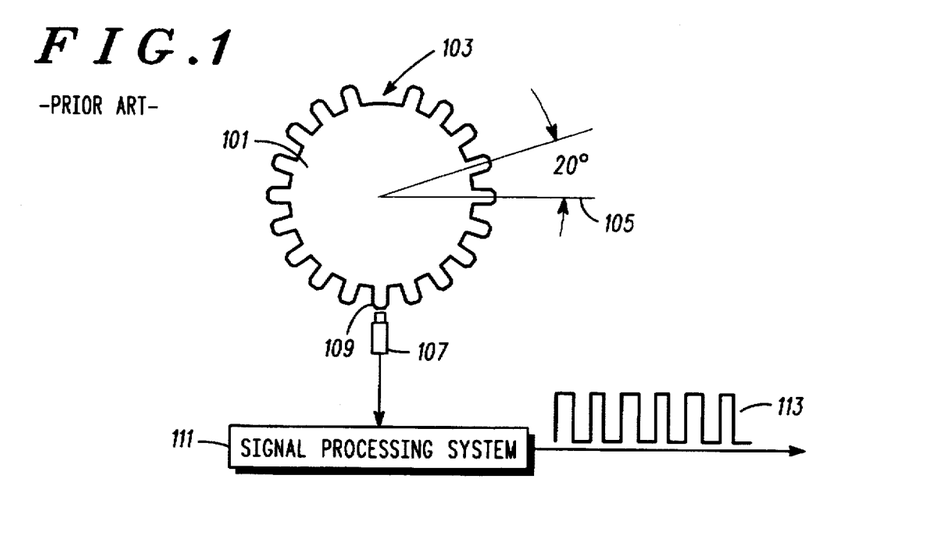
FIG. 1 is a schematic drawing of a prior art digitized target based rotating encoder system.

FIG. 1 shows an engine mounted rotary position encoder system. A wheel 101 has teeth, or positional markers 109 disposed radially on an edge of the wheel 101. The wheel 101 is coupled to a crankshaft of the engine and rotates as the crankshaft rotates. In one approach a tooth is missing on the wheel 101 to indicate an absolute reference position of the wheel 101. This missing tooth 103 marker is used to synchronize the control of the engine dependent on this reference position. Teeth 109 on the wheel are positioned a meaningful distance apart—here 20 degrees. An encoder, or position sensor 107 is positioned across from the wheel 101 and is used to sense the teeth 109 as the wheel 101 rotates driven by the engine's combustion process. A signal processing system 111 interprets an output of the encoder 107 and provides a signal 113 indicative of incremental position of the engine.

Because the teeth 109 are not perfectly formed (in terms of physical position, size and geometry), as the wheel 101 rotates, the position sensor 107 will not perfectly indicate actual (true) physical rotary engine position. A combustion misfiring detection application is typically dependent on measured engine velocity and/or acceleration. If reliant on the described inaccuracies, the combustion misfiring detection systems can yield inaccurate results. Because of the reliance on position encoders for derivation of engine velocity and/or acceleration some systems employ schemes to at least partially compensate for the aforementioned errors caused by position encoders. Later, in FIG. 3, the effect of the encoder profile error will be illustrated.

To correct for the imperfections of the encoder system one prior art scheme measures time between successive rotary positions, as an encoder rotates at a relatively constant speed, and attempts to determine a deviation in each incremental position from a mean of many incremental positions. This deviation is used to derive an encoder profile. This process is typically executed while calibrating an engine in a development and/or a production environment. This analysis results in an encoder profile which typically is recorded in table form. An example follows.

| TOOTH # | POSITION | TIME | DEVIATION |
|---|---|---|---|
| MISSING | 0° | 1.0038 | 0.0008 |
| 1 | 20° | 1.0040 | 0.0006 |
| 2 | 40° | 1.0045 | 0.0001 |
| 3 | 60° | 1.0044 | 0.0002 |
| 4 | 80° | 1.0048 | −0.0002 |
| 5 | 100° | 1.0045 | 0.0001 |
| 6 | 120° | 1.0062 | −0.0016 |
| 7 | 140° | 1.0044 | 0.0002 |
| 8 | 160° | 1.0040 | 0.0006 |
| 9 | 180° | 1.0045 | 0.0001 |
| 10 | 200° | 1.0044 | 0.0002 |
| 11 | 220° | 1.0040 | 0.0006 |
| 12 | 240° | 1.0057 | −0.0011 |
| 13 | 260° | 1.0045 | 0.0001 |
| 14 | 280° | 1.0050 | −0.0004 |
| 15 | 300° | 1.0049 | −0.0003 |
| 16 | 320° | 1.0048 | −0.0002 |
| 17 | 340° | 1.0050 | −0.0004 |
| AVERAGE | | 1.0046 | |

The time column above indicates a time it took the wheel 101 to traverse from a previous tooth position to a current tooth position. The table identifies deviations from an average incremental time for each absolute position (or tooth) of the encoder. Later, when the engine is running and the engine control strategy is executing, the actual measured time between each tooth is modified by an encoder profile, derived from the deviation column above, to more accurately represent the true physical position of the engine. To derive an encoder profile, typically more than one pass of data is taken from the encoder system. These multiple passes are filtered and/or otherwise combined to generate the actual encoder profile.

A problem with this approach is that during measurement of the position encoder's behavior used to synthesize the encoder profile, the engine must be rotating at a relatively constant speed. If it isn't, then further (and maybe larger) errors will be introduced into the measurement process. So, if there is any deviation from a constant engine speed, not attributable to physical encoder construction during measurement of an encoder profile, an error independent of physical encoder construction will be introduced. Known prior art schemes operate the engine in a defueled state during the encoder profile acquisition process. This means that an engine is running then fuel is cut off. After the fuel is cut off the encoder's output is measured to develop a profile. The reason that the fuel is cut off for this process is so that no combustion induced torque aberrations can taint the measurement process. This tainting could occur if there was high combustion variability. High combustion variability can be caused by misfire and other causes such as instability caused by load variation—typically found at high engine speeds while the engine is driving a light load. A deficiency in this defueling scheme is that the engine is decelerating while the encoder's profile is being measured. This deceleration causes an error in the measurement process itself because the measured relationship between incremental position at the instance of starting the measurement process will inherently be different than the measured relationship between incremental position at the completion of the process. This decelerating behavior is clearly shown in FIG. 2.

Figure 2:
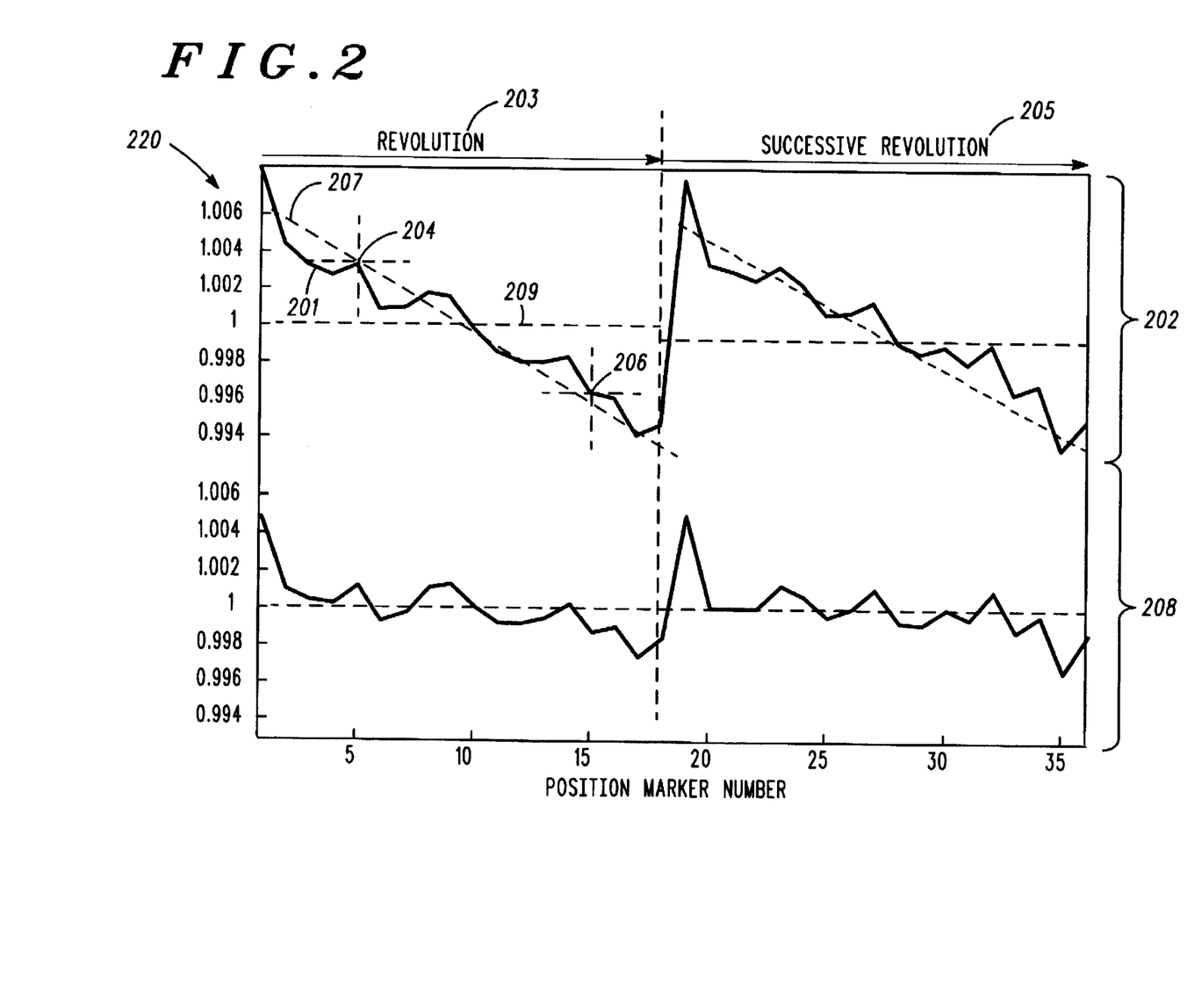
FIG. 2 is a chart illustrating encoder profiles derived from engine position encoder data acquired during an unfueled engine deceleration.

FIG. 2 is a chart illustrating an example of a prior art encoder profile generated from data obtained during an unfueled engine deceleration. A top portion of FIG. 2 202, shows a waveform illustrating an encoder profile over two engine cycles 203, 205. This profile 202 includes a deceleration trend that is indicative of the problem of using this prior art approach. Note that profile correction factors shown 220 are unitless multipliers that are usually near a value of 1.0. A trend line 207 shows the result of engine deceleration on the encoder profile 202 and is undesirable. Notice that as the engine decelerates over the course of a single revolution that the original correction factors become smaller, ranging from more than 1.003 at reference number 24 to less than 0.996 at marker number 206.

Because the described prior art scheme relies on, and does not correct for additional error associated with the defueled deceleration of the engine, the result is a lower fidelity correction of the actual engine measurement during normal engine operation. This lower fidelity correction capability can render the resulting misfire detection system much less capable of detecting misfires, especially at high engine RPM. An example of this result is shown in FIG. 3.

Figure 3:
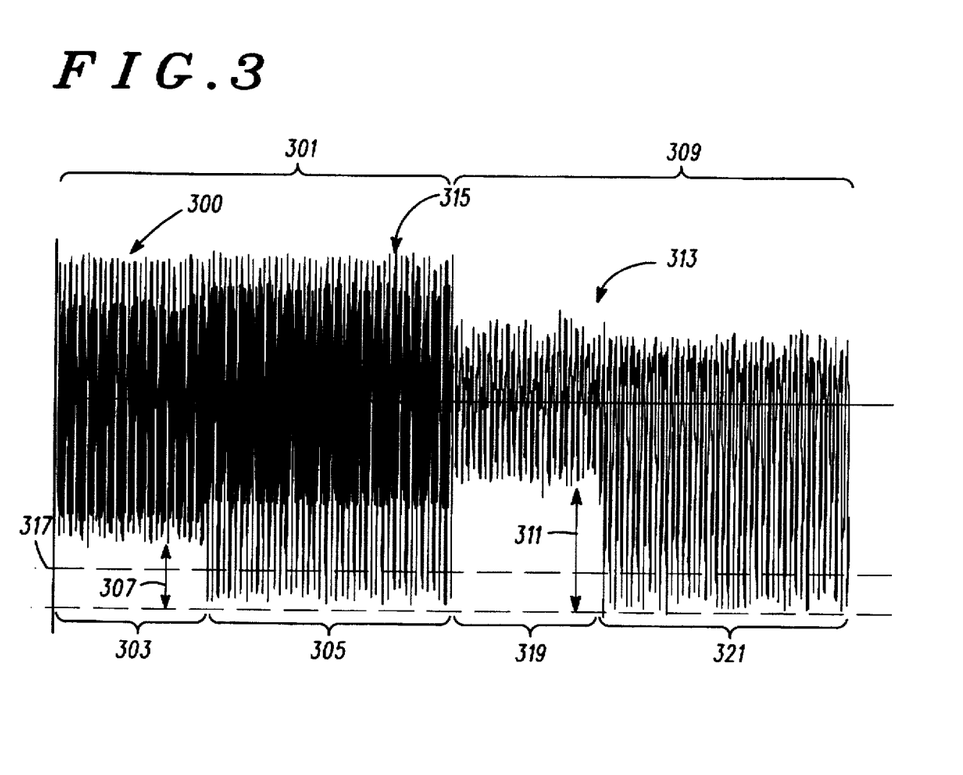
FIG. 3 is a chart showing a first waveform having a separation factor achievable by prior art misfire detection schemes relying on a defueled deceleration for acquiring an encoder profile, and also a second waveform an improved separation factor achievable by application of the present invention.

FIG. 3 is a chart showing a signal achievable by various misfire detection schemes relying on a defueled deceleration for acquiring an encoder profile. An acceleration waveform 300 is derived from an encoder system such as shown in FIG. 1. A first portion 301 of the waveform 300 is reflective of performance expected using prior art encoder profile correction schemes. A first part 303 of the first portion 301 of the waveform 300, shows crankshaft acceleration information related to a normally firing engine. A second part 305 of the first portion 301 of the waveform 300, shows crankshaft acceleration information related to a misfiring engine. Notice that the second part 305 has a stronger negative tendency that the first part 303. A difference 307 between a negative peak of the first part 303 of the first portion 301 of the waveform 300, and a negative peak of the second part 305 of the first portion 301 of the waveform 300, indicates an amount of separation between the two crankshaft acceleration behaviors. The magnitude of this amount of separation corresponds to a separation factor. The separation factor is a metric used by the automotive industry to quantify the quality of an acceleration misfire signal. It can be mathematically described as:

$$\frac{|\overline{X}(\text{misfire events}) - \overline{X}(\text{non-misfire events})|}{\sigma(\text{misfire events}) + \sigma(\text{non-misfire events})}$$

In a misfire detection application a threshold 317 is set to reside bounded within the portion of the waveform 300 where the separation factor 307 resides. Thus, when the crankshaft acceleration waveform 300 exceeds the threshold 317 a misfire is indicated. Preferably, the separation factor 307 is large, making it easier to reliably set the threshold 317.

In conclusion, a large separation factor is better because it makes misfires easier to detect by thresholding algorithms that operate on the acceleration signal. What is needed is an improved approach for encoder profile correction for rotating position encoders that eliminates the various erroneous behaviors associated with acquiring encoder profiles during defueled acceleration and improves the fidelity of the measured crankshaft behavior in terms of the separation factor.

BRIEF DESCRIPTION OF THE DRAWINGS

FIGS. 5A and 5B are charts illustrating various intermediate results of the preferred method steps on actual data.

DETAILED DESCRIPTION OF THE DRAWINGS

A method for detrending encoder profiles includes acquiring an encoder position data over a plurality of consecutive engine revolutions as the engine is decelerating. Then, a trend in the acquired encoder position data consistent with behavior occurring at less than one cycle per engine revolution is identified. Next, corrected encoder position data is generated dependent on the determined trend.

The new method allows the engine rotary position information to be initially acquired in the same manner as prior art approaches, but post-processes the acquired data so that the errors introduced by the deceleration trend are removed from the data and an improved fidelity encoder profile is generated as a result. When the improved fidelity encoder profile is applied to engine rotary position data in a misfire detection system, a significant improvement in the separation factor can be expected. This improvement of the separation factor results in an improved accuracy of detecting misfires over systems using deceleration profiles that have not been detrended. This improvement can be seen in FIG. 3.

Portion 309 shows a crankshaft acceleration signal derived from the same crankshaft as the portion 301 described in the background section. In this case the portion 309 of the signal 300 was processed using an encoder profile that has been detrended using the method described herein. Note that a misfiring portion 321 is approximately equal in amplitude to portion 305 as it extends across the misfire threshold 317. However, a normal firing portion 319 has significantly reduced amplitude compared to normal firing portion (first part) 303. This is evidenced by a significantly larger separation factor 311. This larger separation factor 311 is achievable using the preferred method described herein.

Figure 4A:
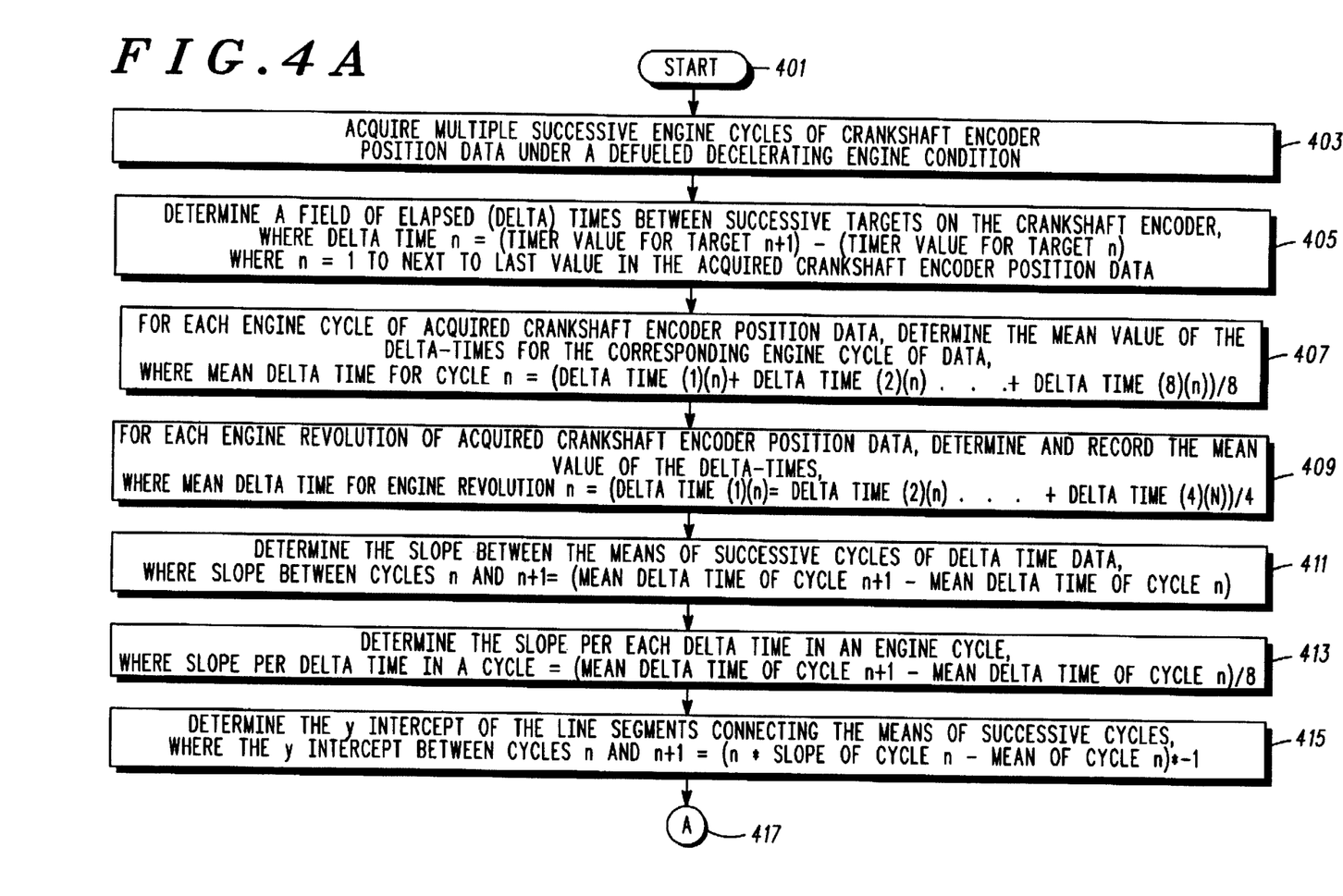
FIGS. 4A and 4B are a flow chart detailing preferred method steps in accordance with the preferred embodiment of the invention.
Figure 4B:
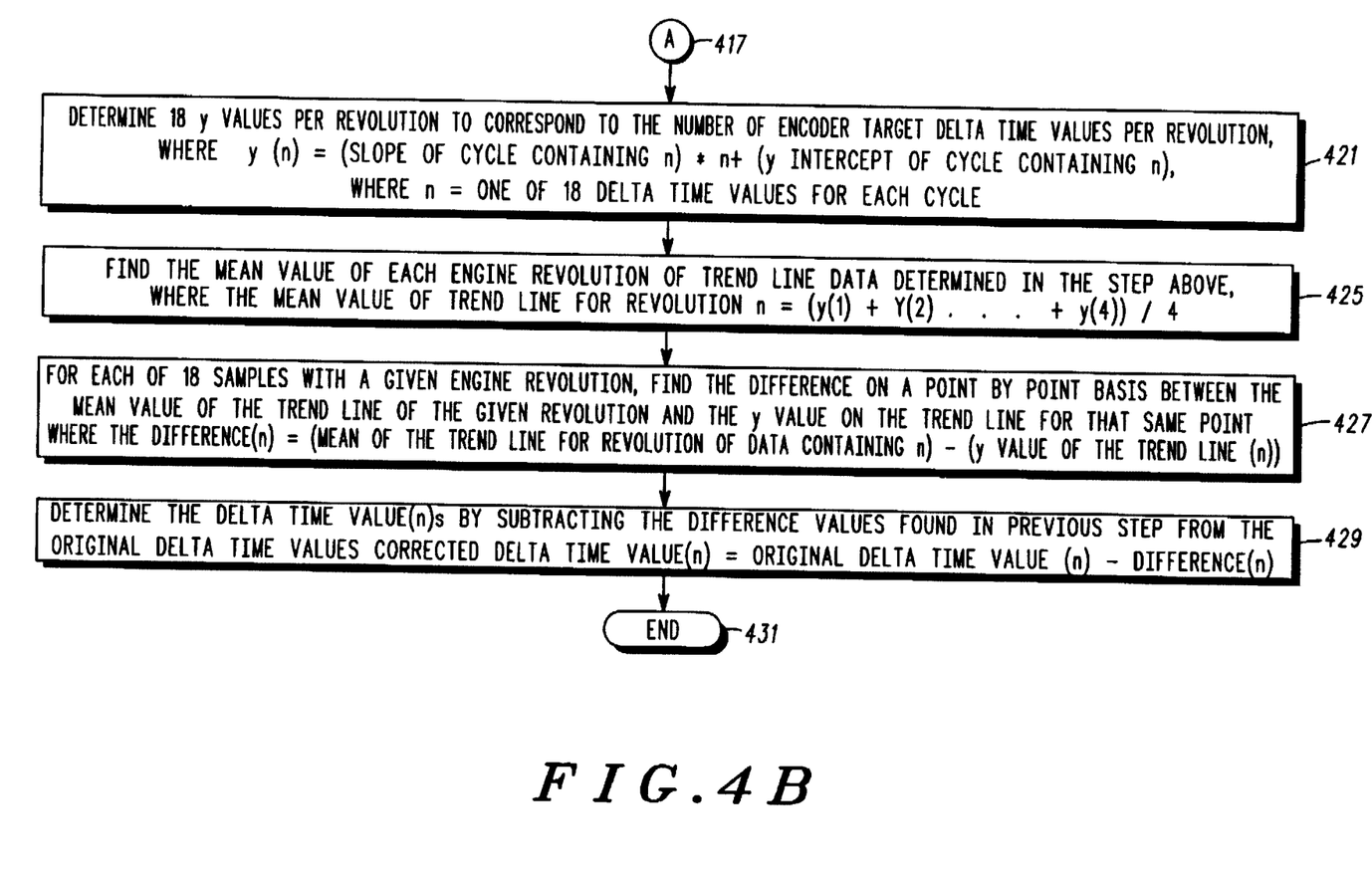
Figure 5A:
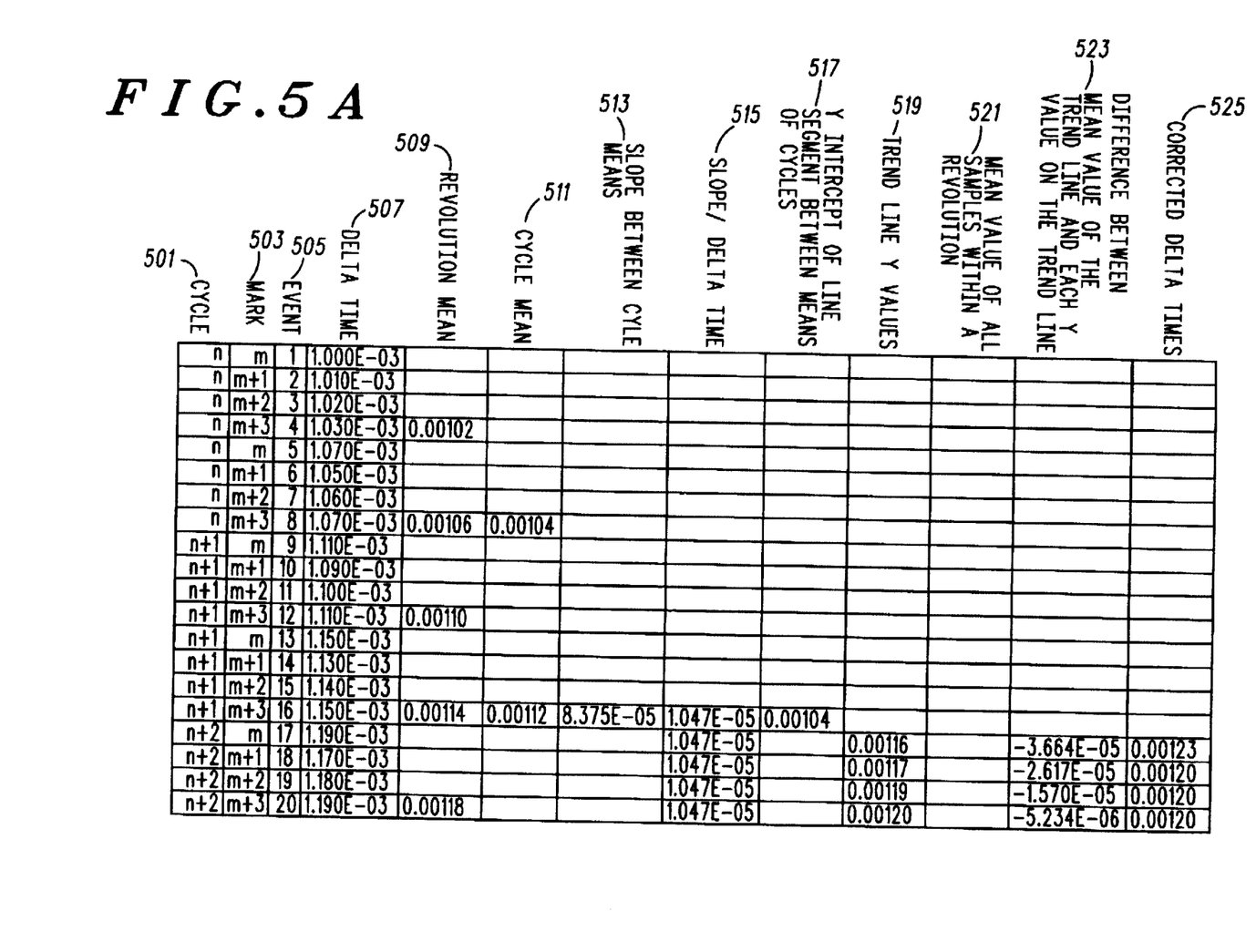

To better understand the details of the preferred embodiment, FIGS. 4A and 4B will be detailed next. FIGS. 5A and 5B will also be referred to in the next section, and are charts illustrating various intermediate results of the preferred method steps of FIGS. 4A and 4B on actual data.

In the preferred embodiment, the signal processing system 111 of FIG. 1 includes a Motorola MC68HC11E9 microcontroller. The Motorola MC68HC11E9 microcontroller is programmed with the method steps shown in FIGS. 4A and 4B. Of course, other microcontrollers and/or dedicated circuits can be devised that use the basic principles described here. The preferred method is invoked at a step 401.

Next, in step 403 the signal processing system 111 acquires and stores multiple successive cycles of crankshaft encoder position data (representative of time durations between successive engine positions demarked by the encoder teeth) when the engine is decelerating in a defueled state. Preferably an encoder data is acquired over at least 8 engine revolutions because of high variability in the encoder data from revolution to revolution. Multiple sets of position data derived from the eight engine revolutions can be statistically manipulated to remove excessive variability and retain only the information that is needed. Preferably, the acquired position data is stored as a high resolution timer value that is captured as the encoder target passes by the sensor. Acquisition of encoder position data over multiple engine cycles is preferred so that sampling variability can be reduced with a filtering or statistical technique. In other embodiments, as little as one cycle of crankshaft data might be used. Referring to FIGS. 5A and 5B (which is a continuation of FIG. 5A), a column labeled cycle 501 shows an engine cycle count. A column labeled mark 503 shows an encoder mark, or tooth index, and a column labeled event 505 shows an index to events acquired. Note that in this (simplified) case an engine crankshaft encoder has 4 marks or teeth labeled m, m+1, m+2, and m+3. It takes two crankshaft revolutions to acquire encoder data associated with all of the cylinder's effects on the encoder system. So, for example event 505 1–8 include (for engine cycle n) two passes or revolutions of the crankshaft marks.

Using the stored timer values (not explicitly shown here), a field of delta times between successive timer values is calculated and stored in step 405. This is performed by executing the following equation:

Delta time $n$=(timer value for target $n+1$)−(timer value for target $n$)

where n−1 to next to last value in the acquired timer stored file.

These delta times are shown in a column labeled delta time 507. So, for the first mark of the cycle "n" a delta time of 1.000 E−03 is recorded. For the second mark cycle "n" a delta time of 1.010 E−03 is recorded.

Then, in step 407, using these determined delta time values, a mean delta time value is determined for each corresponding cycle of data. This action is performed by:

Mean delta time for cycle $n$=(Delta time $(1)(n)$+Delta time$(2)(n)$ . . . +Delta time $(8)(n))/8$.

The mean delta time value for each successive cycle is shown in a column labeled cycle mean 511. So, the first cycle mean is recorded as 0.00104 and consists as the mean of the first two iterations of marks 503 m through m+3.

Then in step 409 the signal processing system 111 determines the mean delta time value for each engine revolution of the stored delta time values by executing the following deterministic equation:

Mean delta time for engine revolution $n$=(Delta time $(1)(n)$+Delta time$(2)(n)$ . . . +Delta time $(4)(n))/4$ The mean value for each engine revolution is shown in a column labeled revolution mean 509. So, the first revolution mean is recorded as 0.00102 and consists as the mean of the first four values of marks 503 m through m+3.

Using mean values of delta times for each cycle, found in step 407, the signal processing system 111 determines a slope of line segments with endpoints of successive mean values 411 by executing the following deterministic equation:

Slope between cycles $n$ and $n+1$=(mean delta time of cycle $n+1$−mean delta time of cycle $n$)

The slope between successive cycle means is shown in a column labeled slope between cycle means 513. So, the slope between cycle means is first recorded as 8.375e−05 and consists of the slope between the first and second cycle mean 511.

Next, in step 413 the signal processing system 111 determines a slope per each delta time in an engine cycle 413 by executing the following deterministic equation:

Slope per delta time in a cycle=(mean delta time of cycle $n+1$−mean delta time of cycle $n$)/8

The slope between successive delta times in an engine cycle is shown in a column labeled slope slope/delta time 515. So, the slope between delta times is first recorded as 1.047e−05 and remains the same value for eight successive entries, since it is calculated based on the mean delta time between successive cycles.

Then, in step 415 the signal processing system 111 determines a y intercept for each line segment with endpoints connecting the means of successive engine cycles (found in 407) by executing the following deterministic equation:

$y$ intercept between cycles $n$ and $n+1$=($n$*slope of cycle $n$−mean of cycle $n$)*−1

The y intercept between cycles n and cycles n+1 is shown in a column labeled y intercept of line segment between means of cycles 517. So, the first entry is recorded as 0.00104.

Next, in step 421 the signal processing system 111, using slope 413 and y intercept 415, determines y values for an engine deceleration trend line that is unique for each revolution. In this embodiment there are 4 y values to be determined for each revolution, to correspond with the 4 delta time values for each revolution as follows.

$y(n)$=(slope of cycle containing $n$)*$n$+($y$ intercept of cycle containing $n$) where $n$=one of 8 delta time values for each cycle The y values for the engine deceleration trend line are shown in a column labeled trend line y values 519. So, for the first entry of trend line y values a value of 0.00116 is recorded.

Then, in step 425 the signal processing system 111 determines a mean value of the trend line y values (found in step 421) for each engine revolution by executing the following deterministic equation:

Mean value of trend line for revolution $n$=($y(1)$+$y(2)$ . . . +$y(4))/4$

The mean value of the trend line for each revolution is shown in a column labeled mean value of all samples within a revolution 521. So, for the first entry of mean values of the trend line, a value of 0.00120 is recorded.

Next, for each of the 4 samples within a given engine revolution find the difference on a point by point basis between the mean value of the trend line of the given revolution and the y value on the trend line for the same point within the revolution in step 427 where:

difference$(n)$=(Mean of the trend line for revolution of data containing $n$)−($y$ value of the trend line$(n)$)

The difference between the mean value of the trend line of the given revolution and the y value on the trend line for the same point within the revolution is shown in a column labeled difference between the mean value of the trend line and each y value on the trend line 523. So, for the first entry a value of −3.664e−05 is recorded.

Then in step 429, determine corrected delta time values by subtracting the difference (or error values) found in step 427 from the original delta time values calculated in step 405 as follows:

corrected delta time value(n)=original delta time value (n)−difference(n)

The corrected delta time values are found in a column labeled corrected delta times 525. So, for the first entry a value of 0.00123 is recorded. These corrected delta times can be used subsequently to create a corrected profile. The result of the steps shown in FIG. 4 when used to generate a profile can be seen in a bottom portion 208 of FIG. 2. Note that the trend line 207 has been removed from the profile. The remaining encoder profile is directly indicative of the positional error associated with the encoder—absent the decelerating behavior of the unfueled engine. Then the routine exits at step 431.

In the simplest case, an encoder profile is generated by the following means. One revolution of time-stamped engine position data is acquired. The time stamp value from one encoder target is subtracted from the subsequent time stamp value, yielding one revolution of delta time values. The arithmetic mean of these delta time values is then calculated. Finally, for each of the specific delta time values in the revolution, a correction factor is calculated by dividing the specific delta time by the mean delta time. These correction factors are unitless values that are centered at 1.0.

correction factor (n)=uncorrected measured delta time for a period (n) between specific encoder targets/mean delta time for all periods over a given engine revolution.

Once calculated and stored, profile correction factors are then used to modify all subsequent engine position data from the same engine and encoder. The correction is achieved by multiplying the new incoming delta time between encoder targets by its specific and corresponding profile correction factor.

corrected delta time (m)=uncorrected delta time (m)× specific correction factor (m)for that delta time period.

Delta time data that is corrected by this method is subsequently used to calculate crankshaft velocity or acceleration or is otherwise used to accomplish engine misfire detection.

In conclusion, an improved approach for encoder profile correction for rotating position encoders has been detailed above. This new approach eliminates the various erroneous behaviors associated with acquiring encoder profiles during defueled acceleration by observing and eliminating slow moving behavior in acquired engine positional data during acquisition of encoder data.

By adopting the described approach, an improved separation factor can be achieved as shown in FIG. 3 at reference number 311. This is vital because certain misfire detection methods will move the misfire threshold 317 around depending on various engine operating conditions. Given the described method, greater flexibility is afforded the engine designer in choosing the misfire detection threshold.

What is claimed is:

1. A method for detrending engine position data for rotating position encoders coupled to an engine comprising the steps of:
   acquiring engine position data over a plurality of consecutive engine revolutions as the engine is decelerating;
   determining a continuously decelerating trend in the acquired engine position data consistent with behavior occurring at a frequency of less than one cycle per engine revolution; and
   providing corrected engine position data by eliminating the determined continuously decelerating trend from the acquired engine position data.

2. A method in accordance with claim 1 wherein the engine position data is representative of time durations between successive engine positions.

3. A method in accordance with claim 2 further comprising a step of:
   constructing an encoder profile dependent on the corrected engine position data.

4. A method in accordance with claim 3 further comprising a step of:
   providing corrected engine position data in a fueled engine dependent on the constructed encoder profile.

5. A method in accordance with claim 2 wherein the step of providing corrected engine position data provides corrected engine position data dependent on a difference between the acquired engine position data and the determined continuously decelerating trend.

6. A method in accordance with claim 5 further comprising a step of:
   determining an encoder profile dependent on the corrected engine position data.

7. A method in accordance with claim 6 wherein the step of acquiring an engine position data over a plurality of consecutive engine revolutions acquires the engine position data over at least eight engine revolutions.

8. A method in accordance with claim 1 wherein the step of acquiring an engine position data comprises a step of acquiring an engine position data over a plurality of consecutive engine revolutions as the engine is not fueled.

9. A method for detrending engine position data for a rotating position encoder coupled to an engine that provides position data corresponding to successively spaced position marks as an engine rotates, the method comprising the steps of:
   acquiring a multitude of continuously increasing time differences occurring between the successively spaced position marks over a plurality of consecutive engine cycles as the engine is continuously decelerating;
   determining a mean time difference for each engine cycle of the plurality of engine cycles dependent on a portion of the multitude of time differences occurring between the successively spaced position marks; and
   providing a corrected delta-time associated with each successively spaced position marks by eliminating a portion of the multitude of continuously increasing time differences occurring between the successively spaced position marks from the mean time difference for each engine cycle of the plurality of engine cycles.

10. A method in accordance with claim 9 wherein the step of acquiring a multitude of continuously increasing time differences over a plurality of consecutive engine revolutions acquires the multitude of time differences over at least eight engine revolutions.

11. A method in accordance with claim 10 wherein the step of acquiring a multitude of continuously increasing time differences comprises a step of acquiring a multitude of continuously increasing time differences over a plurality of consecutive engine revolutions as the engine is not fueled.

12. A method in accordance with claim 9 further comprising a step of:
   constructing an encoder profile dependent on the corrected delta-times associated with each of the successively spaced position marks.

13. A method in accordance with claim 12 further comprising a step of:
   providing encoder profile corrected delta-times associated with each of the successively spaced position marks in a fueled engine dependent on the constructed encoder profile.

14. A method in accordance with claim 11 further comprising a step of:
   constructing an encoder profile dependent on the corrected delta-times associated with each of the successively spaced position marks.

15. A method in accordance with claim 14 further comprising a step of:
   providing encoder profile corrected delta-times associated with each of the successively spaced position marks in a fueled engine dependent on the constructed encoder profile.

16. A method for detrending profile correction factors for a rotating position encoder that provide position data corresponding to successively spaced position marks as an engine rotates, the method comprising the steps of:
   acquiring a multitude of continuously increasing time differences occurring between the successively spaced position marks over a plurality of consecutive engine revolutions as the engine is continuously decelerating;
   determining a mean time difference between successively spaced position marks for each engine revolution of the plurality of engine revolutions dependent on a portion of the multitude of continuously increasing time differences; and
   determining a trend line corresponding to the portion of continuously increasing time differences of the acquired multitude of time differences for each engine revolution;
   determining a difference between a magnitude represented on the trend line and a zero slope line passing through a mean time value for each of the successively spaced position marks and for each engine revolution of the plurality of consecutive engine revolutions and providing error values dependent thereon; and
   providing a corrected delta-time associated with each of the successively spaced position marks dependent on subtracting each of the error values from the acquired multitude of continuously increasing time differences.

17. A method in accordance with claim 16 further comprising a step of:
   constructing an encoder profile dependent on the corrected delta-times associated with each of the successively spaced position marks.

18. A method in accordance with claim 17 further comprising a step of:
   providing corrected engine position data in a fueled engine dependent on the constructed encoder profile.

19. An apparatus for detrending engine position data comprising:
   a sampler for acquiring an engine position data over a plurality of consecutive engine revolutions as the engine is continuously decelerating; and
   a signal processor for determining a continuously decelerating trend in the acquired engine position data consistent with behavior occurring at a frequency of less than one cycle per engine revolution and providing a corrected engine position data by eliminating the determined continuously decelerating trend.

20. An apparatus in accordance with claim 19 wherein the signal processor constructs an encoder profile dependent on the corrected delta-times associated with each of the successively spaced position marks.

21. An apparatus in accordance with claim 20 wherein the signal processor provides corrected engine position data in a fueled engine dependent on the constructed encoder profile.

* * * * *